United States Patent [19]
Ahmed

[11] 3,953,767
[45] Apr. 27, 1976

[54] GROUND FAULT DETECTION APPARATUS

[75] Inventor: Adel Abdel Aziz Ahmed, Annandale, N.J.

[73] Assignee: RCA Corporation, New York, N.Y.

[22] Filed: Apr. 15, 1974

[21] Appl. No.: 461,268

[52] U.S. Cl. .......................... 317/18 D; 317/33 SC
[51] Int. Cl.² .......................................... H02H 3/28
[58] Field of Search .................................. 317/18 D

[56] References Cited
UNITED STATES PATENTS

| | | | |
|---|---|---|---|
| 3,597,656 | 8/1971 | Douglas | 317/18 D |
| 3,723,814 | 3/1973 | Gross | 317/18 D |
| 3,852,642 | 12/1974 | Engel et al. | 317/18 D |

*Primary Examiner*—J. D. Miller
*Assistant Examiner*—Patrick R. Salce
*Attorney, Agent, or Firm*—H. Christoffersen; S. Cohen; A. L. Limberg

[57] ABSTRACT

Unbalance currents in a-c power line conductors are sensed by a differential current transformer. They are then synchronously detected at the line frequency. A substantial direct current component in the detected signal is indicative of a resistive ground-fault and distinguishes such a fault from other types of unbalanced loading of the a-c power line conductors, such as unbalanced-capacitance-to-ground conditions.

8 Claims, 6 Drawing Figures

GROUND FAULT DETECTION APPARATUS

The present invention relates to ground fault detection apparatus as may be used, for example, in ground fault interrupter apparatus for interrupting the supply of a-c power when a resistive ground fault occurs on the power line conductors.

The purpose of a ground fault interrupter is to interrupt the supply of a-c power from a source such as an electric outlet when there is a resistive path between that source and ground. Such a path, for example, may be through a person who, if the power is not immediately turned off, will be exposed to the hazard of electric shock and possible electrocution.

Prior art ground fault detectors sense when the magnetic fields around a pair or pairs of proximate a-c power line conductors fail to buck each other out, that is, they sense when the net magnetic field intensity surrounding the conductors increases. An unbalance current is induced proportional to the intensity of this magnetic field which current is indicative of the magnitude of leakage current from a line conductor to ground.

However, the technique above, when straight-forwardly applied, is not sufficiently discriminating. Unbalance currents caused by resistive faults, such as offered by a person accidentally interposing himself between a power line conductor and ground, cannot be distinguished from unbalance currents caused by the power line conductors having dissimilar capacitances to ground. Such unbalanced capacitance conditions are typically imposed on the a-c power lines by electric motors and false tripping of the ground fault interrupter circuitry caused by switching motors onto the a-c power lines becomes a nuisance.

Conventionally, a ground fault detector senses the magnetic fields around the pair or pairs of proximate a-c power lines using a differential current transformer receiving the a-c power line currents in its primary windings. In the prior art, the secondary winding supplies a relatively high impedance load across which a potential is developed proportional to the current flowing through the ground fault, and the magnitude of this potential is used as an index of ground-fault current(s). This mode of operation tends to require the use of expensive differential current transformer cores, since it is necessary to control its permeability to close tolerances if a predictable ratio between the potential across the secondary winding and ground fault leakage current is to be maintained. Another problem with this mode of operation is that a severe loss of ground-fault detector sensitivity obtains if the ground neutral a-c line conductor is connected to ground both prior to and following the differential current transformer, since this in effect causes a shorted primary turn on the transformer.

Figure 1:
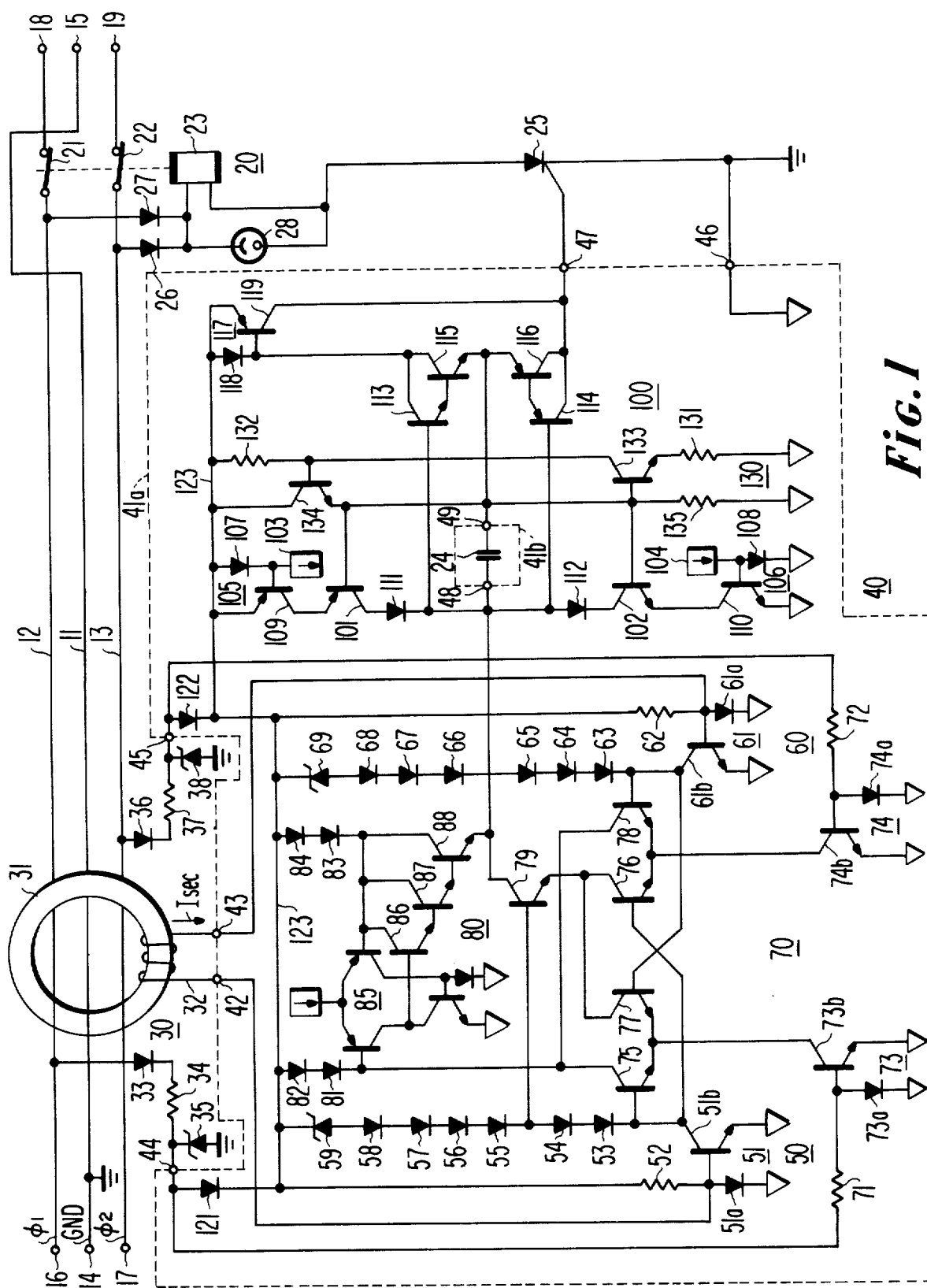
FIG. 1 is a schematic diagram of a ground-fault detection apparatus embodying the present invention as incorporated into a ground-fault interrupter apparatus.

FIG. 1 shows ground-fault interrupter apparatus 10 used with a-c power line conductors 11, 12 and 13. Line conductor 11 runs from terminal 14 to terminal 15 and is connected to power system ground. A-c power is applied between terminal 14 and each of the terminals 16 and 17 to which line conductors 12 and 13 are respectively connected. Terminals 18 and 19 are connected to line conductors 12 and 13, respectively. Terminals 18 and 19 together with terminal 15 are available for having a load or loads connected thereto. The ground fault interrupter apparatus 10 is set up for operation with conductors 11, 12 and 13 being connected in a three-wire, neutral-ground system. In such system, the potentials applied to terminals 16 and 17, as referred to ground-neutral at terminal 14, are equal to each other in magnitude and are oppositely phased with respect to each other. This system is common in house-wiring, where 110 to 120 volt potentials are applied to each of the terminals 16 and 17. Loads may be connected between one of the line conductors 12, 13 and ground conductor 11. Or loads may be connected between line conductors 12 and 13.

A double-pole single-throw relay 20 has its poles 21 and 22 interposed in a-c power line conductors 12 and 13, respectively. Relay 20 operates to interrupt current flow through line conductors 12 and 13 whenever energizing current is applied to its energizing mechanism 23, here shown as an electromagnetic coil. The relay 20 is latched to maintain line conductors 12 and 13 non-conductive until it is reset.

Line conductors 11, 12 and 13 also function as the primary windings of a differential current transformer 30, being threaded through its toroidal core 31 (Other types of cores can also be used in a differential current transformer.) Differential current transformer 30 has a secondary winding 32 which will provide current to its load whenever the currents flowing to the load via line conductors 12 and 13 return to the source of a-c power by some route other than ground-neutral conductor 11.

The ground-fault detector module 40 included between the dotted outlines 41a, 41b may be built in a monolithic integrated circuit. The detector module 40 has terminals 42 and 43 connected to receive unbalance currents induced within the secondary winding 32 of differential current transformer 30. Detector module 40 has terminals 44 and 45 for receiving half-wave rectified and amplitude-limited a-c line potentials $V_{44}$ and $V_{45}$, respectively, from conductors 12 and 13, respectively. Terminal 46 of detector module 40 is connected to system ground to establish local ground. (Connections to this local ground are shown as small triangles.) Terminal 47 is the output terminal for module 40 used for supplying indications of the existence of a ground-fault as determined in response to the signals applied to terminals 42, 43, 44 and 45. Terminals 48 and 49 are for having a capacitor 24 external to the module 40 connected therebetween.

In general terms, the operation of the ground fault detector module 40 involves the following steps. The push-pull unbalance currents supplied to its terminals 42 and 43, respectively, are amplified in amplifiers 50 and 60, respectively; are then applied to a synchronous demodulator or product detector 70; and are subsequently multiplied together with push-pull currents responsive to the rectified and limited line potentials applied to terminals 44 and 45. The synchronous demodulator 70 provides push-pull product signals, one of which is inverted in the current inverting amplifier 80 and is then constructively combined with the other to provide a single-ended product signal for application to terminal 48.

Current inverting amplifier 80 has a high output impedance and current gain of −1. It is of a type fully described in my concurrently filed United States application Ser. No. 461,229 entitled "CURRENT AMPLIFIER" and assigned to a common assignee, RCA Corporation. (In brief, the amplifier 80 works as follows. The combined collector currents of transistors 75 and 78 are applied to serially connected diodes 81 and 82 to develop an offset potential at the inverting input signal port of a differential amplifier 85. This potential is compared by differential amplifier 85 against the offset potential at the non-inverting input signal port of differential amplifier 85, as developed across diodes 83 and 84, to develop an error signal indicative of the difference between these offset potentials. Transistors 86, 87, 88 connected in Darlington cascade provide a composite transistor with very high current gain. Since the composite transistor has very high current gain its "base" current (the base current of transistor 86) will be negligibly small compared to its "collector" current (the combined collector currents of transistors 86, 87, 88) and to its "emitter" current (equal to the emitter currents of transistor 881), and its collector and emitter currents will be almost perfectly equal to each other. The composite transistor provides a direct coupled degenerative feedback connection around differential amplifier 85 to reduce the error signal applied to the base electrode of transistor 86 to very low level. To do this, the emitter current of the composite transistor is regulated to be equal to the combined collector currents of transistors 75 and 78. Then, the potential offset across diodes 81 and 82 caused by these combined collector currents will equal the potential offset across diodes 83 and 84 caused by the composite transistor collector current to reduce the error signal substantially to zero.

The single-ended product signal provided to terminal 48 by current inverting amplifier 80 is integrated by capacitor 24 to remove all its components except the substantially direct ones (sub-audio and direct components). When unbalance current is induced in secondary winding 32 by lines 12 and 13 exhibiting dissimilar capacitance-to-ground, it is in quadrature phasing with the fundamental frequency of the rectified and limited line potentials $V_{44}$ and $V_{45}$. This capacitative-unbalance line condition results in the single-ended product signal current applied to terminal 48 having substantially zero-valued direct component. When unbalance current is induced in secondary winding 32 by ground-fault from one of the lines 12 and 13 to system ground, it is in-phase or 180° out-of-phase with the fundamental frequency of $V_{44}$ and $V_{45}$. This ground-fault line condition results in the single-ended product signal current applied to terminal 48 having either a positive or a negative direct component. The synchronous demodulation of a signal responsive to ground-fault current carried out at line frequency by the product detector 70 can and does supplant the conventional step of rectification of such a signal. The synchronous demodulation step has the marked advantage over rectification that it provides discrimination against components of signal arising from line-to-ground capacitance conditions.

The integrated, single-ended product signal current at terminal 48 is applied to a novel current sensitive threshold detector 100, which senses when it exceeds a predetermined threshold value irrespective of polarity. Only when the direct component of the single-ended synchronous demodulator output is sufficiently large to exceed one of these thresholds, does the current sensitive threshold detector 100 supply via terminal 47 an indication of the presence of a resistive ground-fault. This indication is a positive current applied to trigger the semiconductor controlled rectifier (SCR) 25 into conduction. This completes a conductive path from whichever of the line conductors 12 and 13 is positive at that time through diode 26 or 27, respectively, thence through the magnetic or thermal heating coil of relay 23, and thence through the anode-to-cathode path of SCR 25. Current flow through this path energizes the coil 23 of relay 20 causing its poles 21 and 22 to be switched to disconnect terminals 16 and 17 from terminals 18 and 19, respectively. This interrupts current flow to the ground fault, which supposedly has occured further down the power line. Relay 20 latches to maintain non-conduction through line conductors 12 and 13 until such time as relay 20 is reset.

The SCR 25 continues to be conductive once it is triggered into conduction and thus completes an electrical latching circuit for the energizing coil 23 of relay 20. Resetting of this circuit is accomplished by interrupting the anode-to-cathode current flow of SCR 25. For instance, this may be done by shutting off a-c power to lines 12 and 13 for a brief period. Alternatively, or additionally, the latching of relay 20 may be by one of the conventional mechanical means in which case the relay 20 generally will be reset by hand. If mechanical latching is used, diodes 26 and 27 may be connected to lines 12 and 13 after the poles 21 and 22 of relay 20, so the energizing coil 23 of the tripped relay 20 does not continue to draw power.

The FIG. 1 circuitry has a number of novel aspects and will now be described in detail, beginning with a description of the manner in which operating potential is developed for powering the circuit module 40. Square wave potentials $V_{44}$ and $V_{45}$ appear at terminals 44 and 45, respectively, and have the waveforms 202 and 203, respectively, shown in the FIG. 2 timing diagram. $V_{44}$ and $V_{45}$ are developed, respectively, from the line-to-ground potential $V_{12}$ appearing on line conductor 12; and from the oppositely phased line-to-ground potential $V_{13}$ appearing on line conductor 13.

Figure 2:
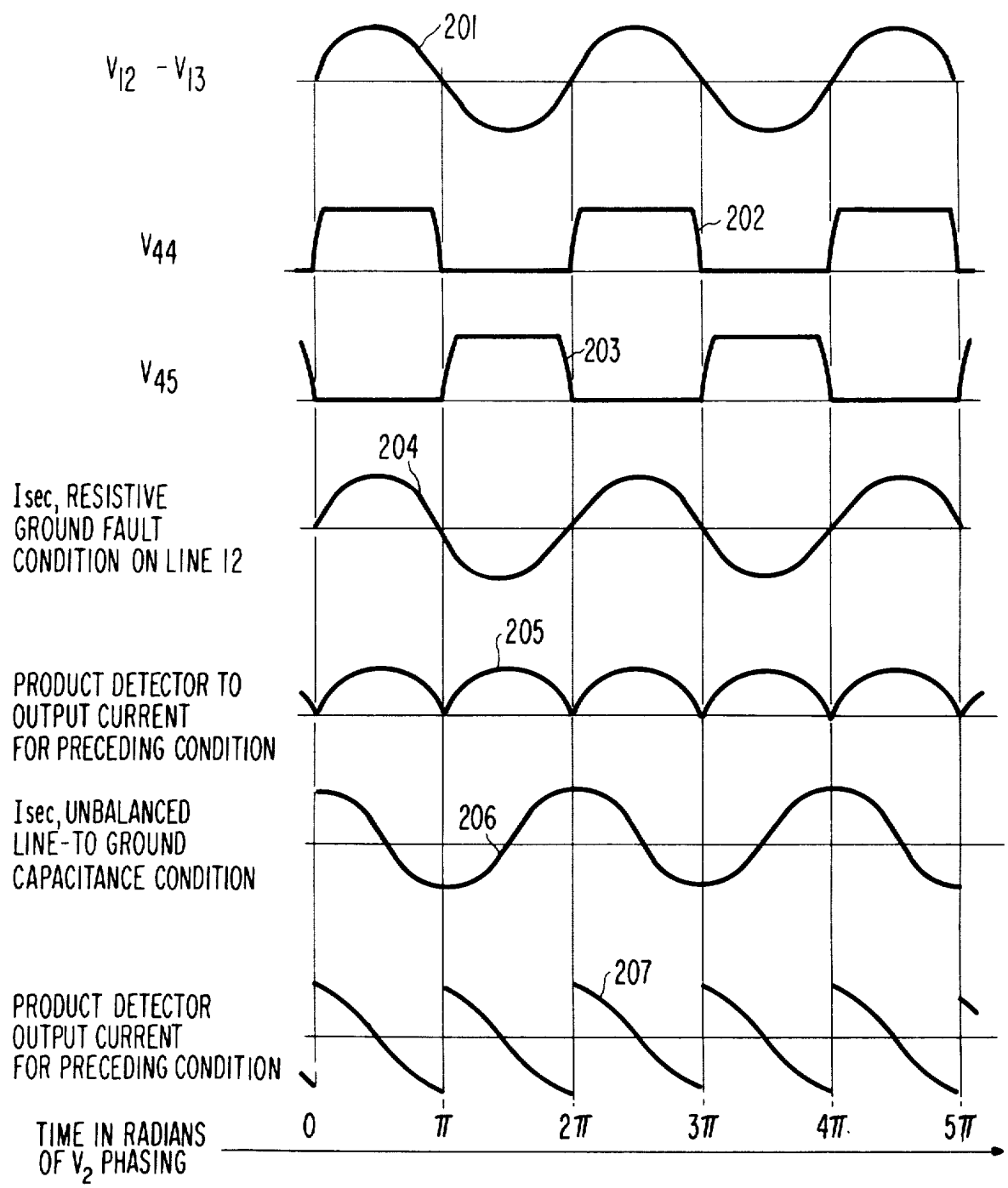
FIG. 2 is a timing diagram useful in explaining the operation of the FIG. 1 apparatus.

$V_{12}$ has a waveform 201 as shown in the FIG. 2 timing diagram. During the negative excursions of $V_{12}$, diode 33 blocks current flow from terminal 44 to line conductor 12. Thus, terminal 44 is free to seek local ground potential (corresponding in the FIG. 1 configuration to ground neutral potential) by conduction through resistor 71 and diode 73a. During positive excursions of $V_{12}$, diode 33 is forward-biased, permitting current flow through itself and resistor 34 to terminal 44. This current flow raises the potential at terminal 44 towards $V_{12}$, to be constrained by the avalanche breakdown of avalanche diode 35. The breakdown of avalanche diode 35 occurs at a potential of 10–15 volts, which is much smaller than the 155–170 volt peak of $V_{12}$, so $V_{44}$ is substantially square in waveform, and is referred to herein as being a square wave. Resistor 34 is chosen to limit current flow through itself and diodes 33 and 35 during positive half-cycles of $V_{12}$ to a value somewhat larger than that required to suply detector module 40 and is used to keep the dissipation of power from diodes 33 and 35 within a tolerable limit.

$V_{45}$ is formed by rectifying and limiting $V_{13}$, oppositely phase to $V_{12}$, by means of elements 36, 37, 38 corresponding to elements 33, 34, 35, respectively, used for rectifying and limiting $V_{12}$ to form $V_{44}$. Therefore, like $V_{44}$, $V_{45}$ is a positive going square wave, but is shifted in timing therefrom by a half cycle ($\pi$ radians) of line frequency as waveforms 202 and 203 of the FIG. 2 timing diagram show. These alternately appearing square wave pulses in $V_{44}$ and $V_{45}$ are used for keying transistors 73b and 74b of synchronous demodulator 70 into alternating conduction as will be further explained hereinafter. Avalanche diodes 35 and 38 are shown as being external to the module 40, but may be included together therewith in an integrated circuit.

The positive excursions of the half-wave rectified and limited line potentials $V_{44}$ and $V_{45}$ applied to terminals 44 and 45, respectively, forward bias diodes 121 and 122, respectively, to be summed and thereby to appear on bus 123 as a full-wave rectified and limited line potential which will hereinafter be referred to as "B+ supply potential". Because of the avalanche diode 35 and 38 each clip a positive excursion of a potential with 155–170 volt peak value whenever those excursions exceed some 10–15 volts, the potentials ($V_{44} + V_{45}$) on bus 123 is a fixed level direct potential except for a few degrees before and after each zero-crossing of line potentials $V_{12}$ and $V_{13}$. The potential ($V_{44} + V_{45}$) is therefore suitable, without need for smoothing by a filter capacitor, for use as a positive B-supply, or operating, potential for the transistor circuits in the detector module 40. The potential appearing on bus 123 will be referred to as B+ potential in the rest of this specificatioon.

Terminal 49 is biased to a potential ½B+ - - - that is, to a potential one-half the B+ potential appearing on bus 123. This is done by means of a potential divider 130 of the type described in U.S. Pat. No. 3,383,612 (Reissue 27,454) originally issued May 14, 1968 to L. A. Harwood; entitled "Integrated Circuit Biasing Arrangements" and assigned, like the present application, to RCA Corporation. In this potential divider 130, resistive elements 131 and 132 have equal resistances. The transistor 133 is connected as a common-emitter amplifier, resistors 131 and 132, respectively, serving as its emitter degeneration resistor and its resistive collector load. The common-collector, emitter follower transistor 134 is connected to provide transistor 133 with direct coupled collector-to-base feedback for maintaining the potential at terminal 49 at the desired level. The resistance of resistor 135 is chosen sufficiently small to sink the collector current of transistor 109 applied to terminal 49 when transistor 101 is operated in saturation. This preserves the desired emitter follower action in transistor 134 for these operating conductions, which action may alternatively be preserved by using a shunt regulating transistor connected to maintain constant current flow through the collector-to-emitter path of transistor 134.

Secondary winding 32 of differential current transformer 30 is in effect presented with a short-circuit load impedance between terminals 42 and 43 of detector module 40 when $V_{44}$ and $V_{45}$ are at peak value. Then, diodes 51a and 61a are maintained strongly forward biased by similar-value quiescent biasing currents supplied to them via bleeder resistors 52 and 62, respectively. The quiescent offset potentials developed across diodes 51a and 61a are equal, permitting direct coupling of secondary winding 32 across terminals 42 and 43 without incurring direct current flow therethrough.

Diodes 51a and 61a are connected with transistors 51b and 61b, respectively, in current mirror amplifiers 51 and 61, respectively. The current gain of current mirror amplifier 51 is the ratio of the transconductance of transistor 51b divided by the conductance of diode 51a, which current gain can be accurately predetermined in an integrated circuit by the proportioning of areas of semiconductor junctions in devices 51a and 51b. The current gain of current mirror amplifier 61 is the ratio of the transconductance of transistor 61b divided by the conductance of diode 61a and is arranged to be equal to the current gain of current mirror amplifier 51. The collector currents of transistors 51b and 61b have equal quiescent components and exhibit push-pull variations proportionally responsive to unbalance current in the secondary winding 32.

The collector current variations of transistor 51b are applied to a collector load comprising serially-connected diodes 53, 54, 55, 56, 57, 58 and an avalanche diode 59; and the collector current variations of transistor 61b are applied to a similar collector load comprising serially connected diodes 63, 64, 65, 66, 67 and 68 and an avalanche diode 69. Avalanche diodes 59 and 69 have equal offset potentials across them (e.g., 6 volts), which offset potentials adjust the base potentials of transistors 75, 76, 77 and 78 downward. In actual practice, the diodes 58 and 68 may have joined anodes connected to bus 123 by a single avalanche diode, eliminating a source of mismatch between the quiescent base potentials of transistors 75, 76 and those of transistors 77, 78. Push-pull signal potentials, responsive to the sum of $I_{SEC}$ and the quiescent bias current as applied to diode 51a or 61a, respectively, appear at the collector electrodes of transistors 51b and 61b.

These push-pull signal potentials will be amplified versions of the signal potentials appearing across diodes 51a and 61a, respectively. The voltage gain will be determined by the ratio of the transconductance of the transistor 51b or 61b divided by the sum of the conductances of the forward-biased diodes in its collector load. In the common instance where each of the diodes in the collector load of transistor 51b (or 61b) is formed by a similar transistor with interconnected base and collector electrodes as an anode and its emitter electrode as a cathode, the voltage gain of the amplifier 50 (or 60) will equal the number of diodes in the collector load—in the FIG. 1 circuit, six. Because of the ability to accurately determine relative transconductances and conductances of semiconductor devices in a monolithic integrated circuit of proportioning their junction areas, these voltage gains of amplifiers 50 and 60 can be very accurately predetermined.

synchronous demodulator, shown in FIG. 1, is a doubly balanced synchronous detector—that is, a synchronous detector in which the signals being multiplied against each other are each balanced out from the current it supplies to terminal 48. The synchronous demodulator 70 comprises a pair of emitter-coupled differential amplifiers (the first with transistors 75 and 77 and the second with transistors 76 and 78), which are alternately keyed into conduction by application of current to the joined emitter electrodes of their transistors. The synchronous demodulator process as practiced in module 40 is wide-angle synchronous detection—that is, the demodulating devices (transistors 75, 76, 77, 78) conduct over a large portion of each cycle of line frequency—so the conversion gain of synchronous demodulator 70 is relatively high compared to what it would be with narrow-angle synchronous detection.

The push-pull signal potential variations supplied from amplifiers 50 and 60 are applied between the base electrodes of emitter-coupled transistors 75 and 77 (or 76 and 78) to modulate their respective emitter currents. Since their applied base potentials exhibit push-pull variations, the joined emitter electrodes of transistors 75 and 77 (or 76 and 78) will be at a virtual ground for signal potential. The common-emitter amplifier operation of any of the transistors 75–78 can then be considered on a single-ended basis for signal. The signal potential variations occuring across diode 51a in response to $I_{SEC}$, as inverted and linearly amplified by amplifier 50, are in effect applied to the base-emitter junction of transistor 75 (or 76). The signal potential variations occurring across diode 61a, in response to $I_{SEC}$ as inverted and linearly amplified by amplifier 60, are in effect applied to the base-emitter junction of transistor 77 (or 78).

For conditions where $I_{SEC}$ and current variations related thereto are small compared to the quiescent currents accompanying them (which is arranged to be the case for $I_{SEC}$ in the current range where ground-fault detection takes place and for smaller values of $I_{SEC}$), the collector currents of transistors 75, 76, 77 and 78 when they are keyed into conduction will be in an accurately predetermined ratio with $I_{SEC}$. This may seem strange, for while the current mirror amplifiers 51 and 61 are known to be linear current amplifiers, the configuration provided by the diode chain collector loads of transistors 51b and 61b and an emitter-coupled transistor amplifier forms a configuration known to respond to an input signal current to provide an output signal current proportional to the input signal current raised to a power equal to the number of diodes in each chain. But, consider the binominal expansion, which describes a binominal term raised to a power n as would be done in a configuration of the sort singled out for attention.

$$(1 \pm x)^n = 1 \pm nx + \frac{n(n-1)}{2} x^2 \pm \frac{n(n-1)(n-2)}{3} x^3 \pm \ldots$$

Where $x$ is small compared to 1, only the first two terms of the expansion are significant. Normalizing a quiescent current through the semiconductor junctions to unity value and expressing the signal current variations as $|x| < 1$, it is seen that the signal current is amplified in the singled-out configuration by the factor n (which factor $n$ corresponds to the number of diodes in each chain 53–58 and 63–68).

Returning to consideration of the synchronous demodulator 70 per se, transistor 73b supplies collector current to the joined emitter electrodes of differential amplifier transistors 75 and 77 when and only when the square wave $V_{44}$ is of sufficient positive value to forward bias the base-emitter junction of transistor 73b and transistor 74b supplies collector current to the joined emitter electrodes of differential amplifier transistors 76 and 78 when and only when $V_{45}$ is of sufficient positive value to forward the base-emitter junction of transistor 74b.

Transistor 73b is connected together with diode 73a in a current mirror amplifier 73 having a current gain equal to the ratio of the transconductance of transistor 73b divided by the conductance of diode 73a. The current flow into the input port of current mirror amplifier 73 during peaks of $V_{44}$ is equal to $V_{44}$ minus the offset potential of forward biased diode 73a, all divided by the resistance of resistor 71. Elements 72, 73a and 74b have characteristics corresponding to those of elements 71, 73a and 73b, respectively; and the collector currents of transistors 73b and 74b are equal-amplitude square waves respectively recurring in alternate half-cycles of line frequency.

When transistor 73b withdraws current from the joined emitter electrodes of transistors 75 and 77 push-pull collector currents, each porportional to unbalance current in winding 32, flow from transistors 75 and 77. When transistor 74b withdraws current from the joined emitter electrodes of transistors 76 and 78, push-pull collector currents, each proportional to unbalance current in winding 32, flow from transistors 76 and 78. The collector current variations of transistors 75 and 78 are each proportional during alternative half cycles of line potentials $V_{12}$ and $V_{13}$, to the unbalance current in winding 32, but each in the opposite sense with respect to the other. The collector current variations of transistors 76 and 77 are each proportional during alternative half-cycles of line potentials $V_{12}$ and $V_{13}$, to the unbalance current in winding 32, but each in the opposite sense with respect to each other. The reason for these proportionalities has previously been explained. They arise from taking the sixth power of a large quiescent current accompanied by small current variations.

Referring to FIG. 2, when a resistive ground fault occurs in line conductor 12, a current $I_{SEC}$ as shown in waveform 204 flows in secondary winding 32. $I_{SEC}$ is in-phase with $V_{12}$. Waveform 205 shows the output current from the synchronous demodulator product detector 70 responsive to this phasing of $I_{SEC}$. Output current waveform 205 is developed as follows.

On positive excursions of $I_{SEC}$, the conduction of transistor 51b is decreased and the conduction of transistor 61b is increased. The increased collector potential of transistor 51b as compared to that of transistor 61b biases transistors 75 and 76 into increased conduction with respect to transistors 77 and 78. Positive excursions of $I_{SEC}$ for a resistive ground-fault on line conductor 12 corresponds to positive excursions of $V_{44}$, so transistor 73b withdraws collector current from the joined emitter electrodes of transistors 75 and 77, while transistor 74b withdraws no collector current from the joined emitter electrodes of transistors 76 and 78. The collector current demand of transistor 75 is inverted by current mirror amplifier 80 to supply a like-valued positive current to terminal 48 which is substantially larger than the current withdrawn from terminal 48 via common-base amplifier transistor 79 to satisfy the collector current demand of transistor 77. Since transistors 76 and 78 have no emitter currents withdrawn from them, they have no collector currents demands to be coupled to terminal 48. A positive half-cycle of current is supplied to terminal 48 by product detector 70 during the positive excursion of the $I_{SEC}$ with waveform 204.

On negative excursions of $I_{SEC}$, the conduction of transistor 51b is increased and the conduction of transistor 61b is decreased. The increased collector potential of transistor 61b as compared to that of transistor 51b biases transistors 77 and 78 into increased conduction with respect to transistors 75 and 76. Negative excursions of $I_{SEC}$ for a resistive ground fault on line conductor 12 correspond in timing to positive excursions of $V_{45}$, and to nulls of $V_{44}$ so transistor 74b withdraws collector current from the joined emitter electrodes of transistors 76 and 78, while transistor 73b withdraws no collector current from the joined emitter electrodes of transistors 75 and 77. The collector current demand of transistor 78 is inverted by current mirror amplifier 80 to supply a like-value positive current to terminal 48 which is substantially larger than the current withdrawn from terminal 48 via common-base amplifier transistor 79 to satisfy the collector current demand of transistor 76. A positive half-cycle is supplied to terminal 48 during the negative excursion of $I_{SEC}$ with waveform 204.

The combined ouput currents from the synchronous demodulator 70 to terminal 48 are proportional to full-wave rectified $I_{SEC}$ for a resistive ground-fault condition on line conductor 12, which rectified current is shown as waveform 205 in the FIG. 2 timing diagram. This rectified current has a d-c component which, if it exceeds a certain threshold value of current absorbed by the current sensitive threshold detector 100, will charge the capacitor 24 to make terminal 48 positive with respect to terminal 49.

When a resistive ground-fault occurs in line conductor 13, an $I_{SEC}$ oppositely phased to waveform 204 will flow in the secondary winding 32 of the differential current transformer 30. Positive excursions of this oppositely-phased $I_{SEC}$ will cause increased conduction of transistor 51b and decreased conduction of transistor 61b. The increased collector potential of transistor 61b as compared to that of transistor 51b biases transistors 77 and 78 into increased conduction with respect to transistors 75 and 76. Positive excursions of $I_{SEC}$ for a resistive ground-fault on line conductor 13 correspond in timing to positive excursions of $V_{45}$ and to nulls of $V_{44}$, so transistor 73b withdraws current from the joined emitter electrodes of transistors 75 and 77, while transistor 74b withdraws no collector current from the joined emitter electrodes of transistors 76 and 78. The collector current demand of transistor 77 is coupled through the common-base amplifier transistor 79 to terminal 48 to supply it a negative half-cycle of current.

On negative excursions of $I_{SEC}$ for a resistive ground-fault on line conductor 13, the conduction of transistor 51b is decreased and the conduction of transistor 61b is increased. The increased collector potential of transistor 51b, as compared to that of transistor 61b, biases transistors 75 and 76 into increased conduction with respect to transistors 77 and 78. Negative excursions of $I_{SEC}$ for a resistive ground-fault on line conductor 13 correspond in timing to positive excursions of $V_{44}$ and to nulls of $V_{45}$, so transistor 73b withdraws collector current from the joined emitter electrodes of transistors 75 and 77, while transistor 74b withdraws no collector current from the joined emitter electrodes of transistors 76 and 78. The collector current demand of transistor 77 is coupled via the common-base amplifier transistor 79 to appear as a negative half-cycle of current flowing to terminal 48.

The current provided from the synchronous demodulator 70 to the terminal 48 for a resistive ground-fault appearing on line conductor 13 is a full-wave rectified, negative current similar in amplitude but oppositely poled to the current shown in waveform 205 of the timing diagram. This negative, full-wave rectified current has a d-c component which, if it exceeds a certain threshold value of current absorbed by the current sensitive threshold detector 100, will charge the capacitor 24 to make terminal 48 negative with respect to terminal 49.

Capacitor 24 integrates rapid current transients applied to it and this provides the ground fault detector module 40 considerable immunity against providing false indications of ground faults in response to switching transients on the line conductors 11, 12, 13. A design criterion meeting Underwriter's Laboratory requirements is to limit the peak current available from synchronous demodulator 70 beginning when a resistive ground fault draws more than 264 milliamperes from a line conductor. This is done by properly choosing the turns ratio of the differential current transformer 30 and the signal voltage gains of amplifiers 50 and 60. The peak current available from the synchronous demodulator 70 is determined by the potential drop (substantially equal to B+ supply potential) appearing across resistor 71 (or 72) divided by its resistance, as amplified by current mirror amplifier 73 (or 74). The capacitance of capacitor 24 is chosen so that 10 milliseconds are required for it to be charged to a level sufficient to cause the threshold switch 100 to trip the latching relay 20. This is normally adequate to discriminate against switching transients as they seldom exceed 2 milliseconds in duration.

The response of the synchronous demodulator 70 to a condition where the capacitance-to-ground of line conductor 12 exceeds that of line conductor 13 will now be considered. The unbalance current $I_{SEC}$ in the secondary winding 32 for this capacitive unbalance condition will have the waveform 206 shown in the FIG. 2 timing diagram. This capacitative unbalance current 206 leads the line potenital $V_{12}$ by 90° ($\pi/2$ radians) in line-frequency phasing.

When $V_{44}$ is positive-valued, causing transistor 73b to withdraw collector current from the joined emitter electrodes of transistors 75 and 77, the positive portion of the signal applied between the base electrodes of transistors 75 and 77, will have substantially the same amplitude distribution over time as its negative portion. Therefore, the collector current damand of transistor 75 over the first half of a positive pulse of $V_{44}$ will be equal to the collector current demand of transitor 77 during the latter half of this pulse. The collector current demand of transistor 75 is applied to the input port of the current mirror amplifier 80, which responds to supply a similar-valued current from its output port to the terminal 48. The collector current demand of transistor 77 is coupled via a common-base amplifier transistor 79 to withdraw a similar-valued current from terminal 48. Insofar as the capacitor 24 is concerned the charge accumulated in response to current suppliec from current mirror amplifier 80 during the first half of the positive pulse of $V_{44}$, equals the charge suppliec from capacitor 24 to satisfy the collector demands o transistor 79 during the second half of the positive pulse of $V_{44}$. Therefore, no net charge will be accumulated on the capacitor 24 during the half-cycles when $V_{44}$ is positive-valued.

On the following half-cycle, when $V_{45}$ is positive-valued, causing transistor 74b to withdraw a collector current from the joined emitter electrodes of transistors 76 and 78, the negative portion of the signal applied between the base electrodes will have substantially the same amplitude distribution over time as its positive portion. Therefore, the collector current demand of transistor 78 over the first half of a positive pulse of $V_{45}$ will be equal to the collector current demand of transistor 76 during the later half of this pulse. The collector current demand of transistor 78 is applied to the input port of the current mirror amplifier 80 which responds to supply a similar-valued current from its output port of the terminal 48. The collector current demand of the transistor 76 is coupled via common-base amplifier transistor 79 to withdraw a similar-valued current from terminal 48.

Insofar as the capacitance 24 is concerned, the charge accumulated in response to current supply from current mirror amplifier 80 during the first half of the positive pulse of $V_{45}$ equals the charge supplied from capacitor 24 to satisfy the collector current demand of transistor 79, during the second half of the positive pulse of $V_{45}$. Therefore, no net charge will be accumulated on the capacitor 24 during the half cycles when $V_{45}$ is positive-valued as well as during the alternative half cycles when $V_{44}$ is positive-valued. The potential developed across capacitor 24 by this alternate charging and discharging is arranged to be insufficiently large to forward bias the base-to-emitter junctions of the Darlington-connected transistors 113, 115 or 114, 116. Therefore, no positive current will be supplied from terminals 47 to trigger SCR 25 into conduction for the capacitative unbalance condition.

The response of the synchronous demodulator 70 to a condition where the capacitance of ground-to-ground of line conductor 13 exceeds that of line conductor 12 will be an output current equal in amplitude but opposite in polarity to that in waveform 207 of FIG. 2. For this condition, also, the recurrent charging and discharging of capacitor will not cause sufficient potential thereacross to forward-bias the Darlington-connected transistors 113, 115 or 114, 116.

In the current-sensitive threshold detector 100, PNP transistor 101 and NPN transistor 103 each have their base electrodes connected to terminal 49 to be biased at ½ B+ potential. Transistor 101 is biased for constant-emitter current operation by the constant current sink 103 and the current mirror amplifier 105, comprising diode 107 and transistor 109; and transistor 102 is biased for constant emitter current operation by the constant current source 104 and the current mirror amplifier 106, comprising diode 108 and transistor 110. The emitter currents of transistors 101 and 102 are made equal, as may be done by making current mirror amplifiers 105 and 106 to have equal gains and using a common element such as a resistor connected between the base electrodes of transistors 109 and 110 to serve as both current sink 103 and current source 104. Considering transistor 101, by forcing its emitter current to be of a determinate value, its emitter electrode will be at a fixed $V_{BE}$ offset potential with regard to its base electrode; and, similarly, for transistor 102.

Diode 111 connects the collector electrode of transistor 101 to the terminal 48 at the input of the current sensitive threshold detector 100. Diode 112 connects the collector electrode of transistor 102 to terminal 48. When no current is supplied to or withdrawn from the interconnection of diodes 111 and 112 except for the currents flowing through these diodes themselves, diodes 111 and 112 are forward biased by collector current flow from transistor 101 to transistor 102 thereby to maintain a $2V_{BE}$ offset potential across themselves. Since the base electrodes of PNP transistor 101 and NPN transistor 102 are connected to the same potential, this $2V_{BE}$ potential tends to forward bias the collector-base junctions of both transistors 101 and 102.

This tendency is such as to cause one or the other of transistors 101 and 102 to operate in saturation, with its collector-base junction forward biased to refer its collector electrode to a potential only slightly removed from its emitter potential. If transistor 101 is in pronounced saturation, its collector electrode will be less positive than its emitter electrode by its collector-to-emitter saturation potential or $V_{SAT}$, which is usually quite well-defined at about 0.1 to 0.2 volts. Since, as noted above, its emitter potential is $1V_{BE}$ more positive than the ½ B+ potential at terminal 49, this places the collector electrode of transistor 101 at a positive potential ($V_{BE} - V_{SAT}$) with respect to ½ B+ potential. The potential of the collector electrode of transistor 101 is also the potential at the anode of the diode 111, so the cathode of that diode, being $1V_{BE}$ less positive than its anode potential, is at a potential $V_{SAT}$ less positive than the potential at terminal 49. This means that there is insufficient potential between terminals 48 and 49 to forward bias serially-connected junctions of the Darlington-connected PNP transistors 114 and 116, much less to forward bias the serially-connected base-emitter junctions of the Darlington-connected NPN transistors 113 and 115.

Conversely, if transistor 102 is in pronounced saturation, its collector electrode will be more positive than its emitter electrode by its collector-to-emitter saturation potential or $V_{SAT}$, like that of transistor 101, is usually quite well-defined at about 0.1 or 0.2 volts. Since the emitter potential of transistor 102 is, as noted above, $1V_{BE}$ less positive than the ½ B+ potential at terminal 49, this places the collector electrode of transistor 102 at a negative potential ($V_{BE} - V_{SAT}$) with respect to ½ B+ potential. The potential at the collector electrode of transistor 102 is also the potential at the cathode of the diode 112, so the anode of that diode being $1V_{BE}$ more positive than its cathode potential is at a potential $V_{SAT}$ more positive than the ½ B+ potential at terminal 49. This potential is insufficient to forward bias the serially-connected junctions of transistors 113, 115 much less the serially-connected base-emitter junctions of transistors 114, 116.

In the unlikely event transistors 101 and 102 are both in or almost in saturation, absent current being applied to or withdrawn from terminal 48 except via diodes 111 and 112, the potential at terminal 48 will lie somewhere in the range of ½ B+ ± $V_{SAT}$, as defined by the two boundary conditions just described.

Suppose now a positive current is applied from the synchronous demodulator 70 to the circuit node to which terminal 48 is connected. This positive current will tend to place charge on capacitor 24 and so raise the potential at terminal 48. This increased positive potential at terminal 48 will guarantee that transistor 101 operates in its saturation mode and will make the back-to-back connection of the diode 111 and the collector-base junction of transistor 101 less conductive. This will force the constant emitter current of transistor 101 to flow in increased measure to its base electrode and in decreased measure to its collector electrode.

Slightly raising the potential at terminal 48 removes transistor 102 from saturation—if indeed it has been in saturation. Transistor 102 is biased in its normal operating mode, therefore, and will demand collector current substantially equal to the constant current withdrawn from its emitter electrode. The entire positive current supplied from the synchronous demodulator 70 will flow through diode 112 to the collector electrode of transistor 102 to meet this collector current demand unless and until this positive current exceeds the collector current demand of transistor 102.

When the positive current from the synchronous demodulator 70 exceeds the collector current demand of transistor 102, the excess current flows to charge the capacitor 24 further. This further charging raises the potential of terminal 48 with respect to the ½ B+ potential at terminal 49 so as to apply forward bias to the base-emitter junctions of Darlington-connected transistors 113 and 115, causing them to draw collector currents from the input port of a current mirror amplifier 117. (Current mirror amplifier 117 is shown as comprising diode 118 and transistor 119.) The current mirror amplifier 117 responds to supply a positive current from its output port to terminal 47 of the detector module 40. This positive current triggers the SCR 25, which in turn, causes the relay 20 to interrupt current flow in line conductors 12 and 13.

Suppose, now, a negative current is applied from the synchronous demodulator 70 to the circuit node at terminal 48. This negatice current will tend to place charge on capacitor 24 and so lower the potential at terminal 48. This decreased positive potential at terminal 48 will guarantee that transistor 102 operates in its saturation mode and will make the back-to-back connection of the diode 112 and the collector-base junction of transistor 102 less conductive. This will force the constant emitter current of transistor 102 to flow in increased measure to its base electrode and in decreased measure to its collector electrode. Slightly decreasing the positive potential at terminal 48 removes transistor 101 from saturation—if, indeed, it has been saturated. Transistor 101 is biased in its normal operating mode, therefore, and will supply a collector current substantially equal to the constant current withdrawn from its emitter electrode. The entire negative current supplied from the synchronous demodulator 70 is, in effect, a current demand and will be supplied by the collector current of transistor 101 flowing through diode 111 unless and until this demand exceeds the capability of transistor 101 to supply collector current. This capability of transistor 101 is to supply collector current to meet the demand of the synchronous demodulator 70 is limited to a current level substantially equal to the constant current suppoles to its emitter electrode.

When the current demand of the synchronous demodulator 70 exceeds the capability of transistor 101 to supply collector current the excess current requirement must be supplied by the capacitor 24. Supplying this excess current demand charges the capacitor 24 to make the potential at terminal 48 increasingly negative with respcet to the potential at terminal 49. This applies forward bias to the base-emitter junctions of Darlington connected transistors 114 and 116, causing them to supply positive collector currents to terminal 47 of the detector module 40. The positive current from terminal 47 triggers the SCR 25, which, in turn, causes the relay 20 to interrupt current flow in line conductors 12 and 13.

The use of a current-sensitive threshold detector 100 responsive to synchronously detected unbalance currents of either positive or negative polarity offers the advantage that the connections of secondary winding 32 between terminals 42 and 43, can be interchanged by mistake or by reason of ignoring the polarity of connection, without altering the response of the ground-fault detector module 40. However, current-sensitive threshold detectors only responsive to synchronously detected unbalance currents of one polarity can replace detector 100 without loss of operation, provided care is taken concerning the polarity of connection of winding 32.

The charging of capacitor 24 cannot proceed, as has been noted, until the synchronous demodulator 70:

a. provides a negative output current which exceeds the threshold current level absorbed as collector current by transistor 101; or b. alternatively, provides a positive output current which exceeds the threshold current level absorbed as collector current by transistor 102.

This means that a certain amount of internally generated noise in the transistors of amplifiers 50 and 60 and of synchronous demodulator 70 will not cause response from detector 100. Also, electrical "hash" appearing on the power line conductors 11, 12, 13 will not be responded to by detector 100. But, more importantly, small quiescent direct current output, resulting from the synchronous demodulator 70 being imperfectly balanced for $I_{SEC} = 0$ conditions, will not cause detector 100 to respond. Perfect balance of synchronous demodulator 70 for $I_{SEC} = 0$ conditions is difficult to achieve during the brief interval during average-axis crossings of the line potentials when the B+ supply potential on bus 123 collapses because $V_{44}$ and $V_{45}$ pulses do not overlap. Only after the one or the other of the threshold input currents has been exceeded will the charging of capacitor 24 begin and continue until the threshold potential required to bias Darlington-connected transistors 113, 115 or 114, 116 into conduction is obtained.

The ground-fault detection apparatus of the present invention differs in an important particular from the prior art in that the secondary winding 32 of the differential current transformer 30 is short-circuit loaded rather than open-circuit loaded by the amplifier and comparator circuitry connected thereafter. This permits the use of core material with wide tolerances in permeability to be used in transformer 30 without the sensitivity of the ground fault detector apparatus being affected as it was in prior art designs where the secondary winding 32 was lightly loaded. Practically speaking, this means that even in mass production, a cheap ferrite core wtih a wide tolerance on its permeability can be used in the differential current transformer instead of a selected ferrite core or a laminated ferrous core, both of which alternatives are relatively expensive. The reason for this advantage obtained by short-circuit loading of the secondary winding will be explained with the aid of FIGS. 3, 4 and 5.

Figure 3:
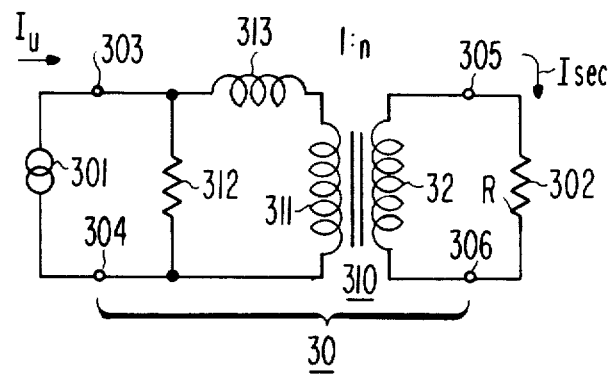
FIGS. 3 and 4 are equivalent circuits of prior art ground-fault detection apparatus.

FIG. 3 shows a Norton equivalent source 301 of a-c unbalance current and an equivalent circuit of differential current transformer 30 and load 203 presented to its secondary winding 32 by the input circuit of the detector module 40.

The line and neutral conductors 11, 12, 13 are here considered as primary windings assumed to be equivalent to a single primary winding, carrying an unbalance current equal to the difference of their separate currents. This is a valid assumption because a transformer with toroidal coupling has a tight mutual coupling between windings. This equivalent primary winding is connected by means of terminals 303 and 304 to have a primary winding unbalance current $I_U$ applied thereto from the Norton equivalent a-c source 301. $I_U$ corresponds in magnitude to the ground-fault current causing the secondary winding unbalance current, $I_{SEC}$. The secondary winding 32 has output terminals 305 and 306 between which load 302 having an impedance R is connected.

Transformer 30 is shown as comprising a transformer 310 having perfect mutual coupling between its primary winding 311 and secondary winding 32. The turns ratio of the primary winding to secondary winding is 1:n. The resistive element 312 represents the copper and core ("iron") losses in transformer 30, and the inductive element 313 represents the leakage inductance. For the toroidal core transformers employed in ground-fault detection, leakage inductance is small compared to the primary winding inductance, so inductive element 313 may be replaced by a direct connection. The copper and core losses of well-designed transformers are small. Therefore, the resistive element 312 normally has a resistance relatively large as compared to the transformed impedance $R/n^2$ of the load 302 appearing across winding 311. Consequently, resistive element 312 may be omitted from further consideration.

Figure 4:
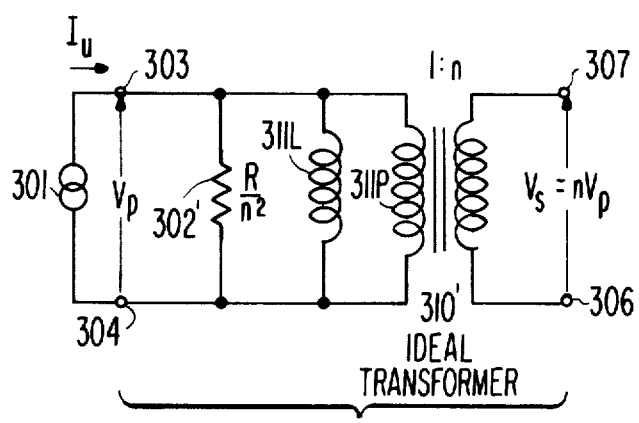

FIG. 4 shows the equivalent circuit which can now be developed. The impedance of load 302 has been relocated from the secondary winding circuit of transformer 30 to its primary winding 311. The relocated load impedance 302' has an impedance $R/n^2$ so it presents the same impedance between terminals 303 and 304 as would a load impedance 302 connected between terminals 305 and 306 after transformation by a transformer with 1:n turns ratio.

The actual transformer 310 has been replaced by the equivalent circuit provided by an inductive element 311L and an ideal transformer 310' having a 1:n turns ratio. Inductive element 311L has the same inductance as primary winding 311 of the FIG. 3 circuit. The ideal transformer 310' presents an infinite impedance across its primary winding 311P since the primary winding 311 itself has infinite impedance and since secondary winding 32 is open-circuited. The potential $V_P$ appearing between terminals 304 and 303 in response to the a-c primary-winding unbalance current $I_U$ is transformed by ideal transformer 310' to produce a potential $V_S$ between terminals 306 and 307.

$$V_S = nV_P; \qquad (1)$$

that is, $V_S$ is larger than $V_P$ by the factor $n$, the voltage step-up ratio of the transformer due to its turns ratio 1:n.

The potential $V_P$ appearing between terminals 304 and 303 is determined in accordance with Ohm's Law of Electrical Circuits by the unbalance current $I_U$ flowing through the parallel combination of resistive element 302' an inductive element 311L. (No portion of $I_U$ flows through the primary winding 311P since as noted above, it presents an infinite impedance.) This relationship can be expressed mathematically as follows:

$$V_P = I_U \left[ \frac{\left(\frac{R}{n^2}\right)(jwL)}{\left(\frac{R}{n^2}\right) + (jwL)} \right] \qquad (2)$$

where L is the inductance of element 311L or the primary winding inductance of transformers 30 or 310. Combining equations 1 and 2, $$V_S = nI_U \left[ \frac{\left(\frac{R}{n^2}\right)(jwL)}{\left(\frac{R}{n^2}\right) + (jwL)} \right] \qquad (3)$$

It is desirable to make $V_S$ a reproducible function of $I_U$, so a threshold detector can sense whenever a pre-programmed ground-fault current flow is exceeded.

This can eliminate the need for providing for adjustment of the threshold level at which a threshold detector 30 will provide indication of the occurrence of a ground-fault. Supposing $V_S$ to be in an ascertainable proportional relationship with $I_U$ and the gain of amplifiers preceeding the threshold detector to be accurately predetermined, the threshold level corresponding to a predetermined ground-fault flow will be known.

In prior art ground-fault detection systems $R/n^2$ is larger than jwL, since the input impedance R presented to the secondary winding 32 is relatively large. In such case, equation 3 approaches a limit condition where:

$$V_S = I_U jwL \qquad (4)$$

The dependence of $V_S$ upon $jwL$, the primary inductance of transformer 30, in the prior art circuit makes it impossible to maintain the same proportionality between $V_S$ and $I_U$ over all production units of a ground-fault detection system, unless L be maintained constant from unit to unit. This means that if costly assembly line adjustments are to be avoided, the reluctance of the transformer cores (31's) must not vary from unit to unit. Furthermore, the effect of core temperature variation is to change the permeability. Therefore, expensive cores made of selected alloys have to be used in prior art circuits. Accordingly, production line production of these ground-fault detection systems has required that transformers with ferrous cores be used. These cores generally are of laminated construction to cut eddy current losses.

Ferrite cores are inexpensive compared to ferrous cores. Ferrite core material has low reluctance per unit volume (i.e., high permeability) compared to ferrous core material. This higher permeability is one of the important factors permitting transformer 30 to be reduced in physical volume for a given range of current levels over which linear transformer action is to be provided. Heretofore, ferrite core transformers have not been suitable for use in volume production of ground-fault detection systems without adjustments, however, because the permeability of their cores varies over too wide a range of tolerances and with temperature. The wide tolerances of the permeability of the core material causes similar wide tolerances in the primary winding inductance L of the transformer. This wide variation of $L$ cannot be tolerated in production, as noted above. Selection of cores to narrow the tolerances upon $L$ increases the price of ferrite cores vis-a-vis ferrous cores and is not economically justifiable.

Figure 5:
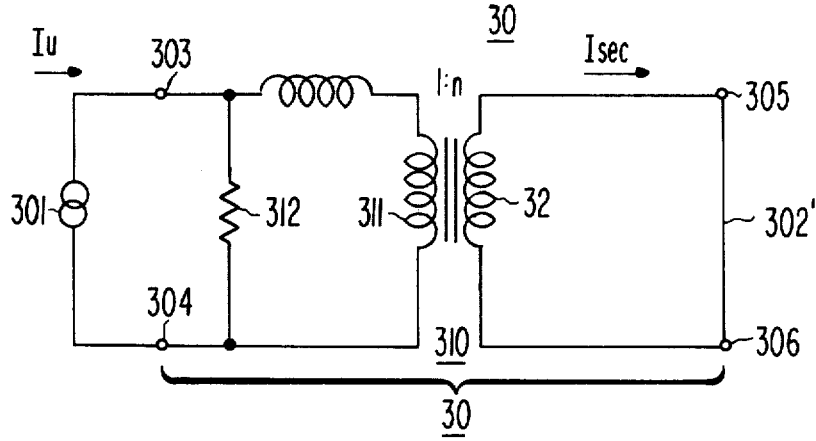
FIG. 5 is an equivalent circuit of ground-fault detection apparatus embodying the present invention, which when considered with the equivalent circuits of FIGS. 3 and 4 is useful in explaining an aspect of the present invention.

FIG. 5 shows the equivalent circuit of transformer 30 when its secondary winding 32 is loaded by a short-circuit 302', a condition which can be closely approximated with certain known types of amplifiers. Since transformer 310 has very tight coupling, the impedance presented by its primary winding 311 will be $1/n^2$ times its load impedance 302' which load impedance 302' is essentially a short circuit. The primary winding 311 is a short circuit and since leakage inductance 313 has negligible impedance compared to the resistive element 312 representing copper and core losses, $I_U$ will flow substantially entirely through the branch of the circuit comprising elements 313 and 311 rather than through the alternative branch in parallel comprising resistive element 312.

Since $I_U$ flows as primary current in the primary winding 311, and transformer 310 has a 1:$n$ turns ratio, the secondary current $I_{SEC}$ flowing in the secondary winding 32 must be $I_U/n$. This $I_U/n$ secondary current flows through th low impedance 302'. The ratio of this $I_{SEC} = I_U/n$ current to the $I_U$ primary current does not depend upon the inductance of the transformer, so the permeability of the core material no longer needs to be constrained to a narrow range of values and the effects of variations caused by temperature changes has a negligible effect.

Maintaining the ratio of $I_{SEC}$ flowing in the secondary winding 32 to the unbalance current flow in the primaries at a predetermined value from unit-to-unit of manufacture depends only on the following factors:

(1). The turns ratio of the transformer 30 must always be maintained in accurate ratio, which presents no formidable technological problem even in mass manufacture;

(2). The coupling of the transformer 30 must be maintained reasonably tight, which presents no appreciable problem for toroidal cores of sufficient size and of high permeability;

(3). The leakage inductance 313 of the transformer 30 must be kept low compared to the equivalent resistance 312 presented by the copper and core or iron losses; and (4). The input impedance of detector module 40 between its input terminals 42 and 43, divided by the square of the turns ratio must also be kept low compared to the equivalent resistance 312.

Each of the above listed factors can be easily controlled during the course of mass manufacturing.

The low input impedance offered at terminals 44, 45 to the secondary winding 32 for normal unbalance current levels during ground fault is, as noted above, provided by applying relatively large quiescent currents via bleeder resistors 52 and 53 to diodes 51$a$ and 61$a$, respectively, to maintain the diodes in strong forward bias. This raises the problem of relatively large quiescent currents accompanied by relatively small current variations being introduced into a direct-coupled amplifier and detection apparatus. Extensive use of direct-coupling is necessary in monolithic integrated circuitry, since neither coupling capacitors nor transformers can be integrated easily and since the number of terminals which can practically be made available for connection to non-integrated components is limited to about 14 to 24. The problem of keeping the large quiescent currents used to reduce input impedances at terminals 44, 45 from inordinately reducing the range available for signal variations after amplification is solved by admitting balanced $I_{SEC}$ variations and then using the common-mode rejection of the emitter-coupled differential amplifiers 75, 77 and 76, 78 in the synchronous demodulator 70 to suppress the quiescent currents admixed therewith.

Also, the amplifiers 50 and 60 having diodes 51$a$ and 61$b$ at their respective inputs exhibit very small input potential changes for very large ranges of input current (a 25 millivolt change for every doubling of current therethrough — that is, an exponential change with increasing current rather than the linear response characteristic of amplifiers with linear input resistances). The amplifiers 50 and 60 having non-linear collector loads provided by the diode chains 53–58 and 63–68, respectively, similarly exhibit quite small potential changes across themselves for very large ranges of output current. However, these potential changes can be large enough to modulate the current flows through differential amplifiers 75, 76 and 77, 78 in the synchronous demodulator 70 over substantial portions of their ranges. Accordingly, the amplifiers 50 and 60 are of a form well-suited to accomodating the relatively large quiescent currents accompanying variations responsive to the push-pull $I_{SEC}$ currents from winding 32.

Figure 6:
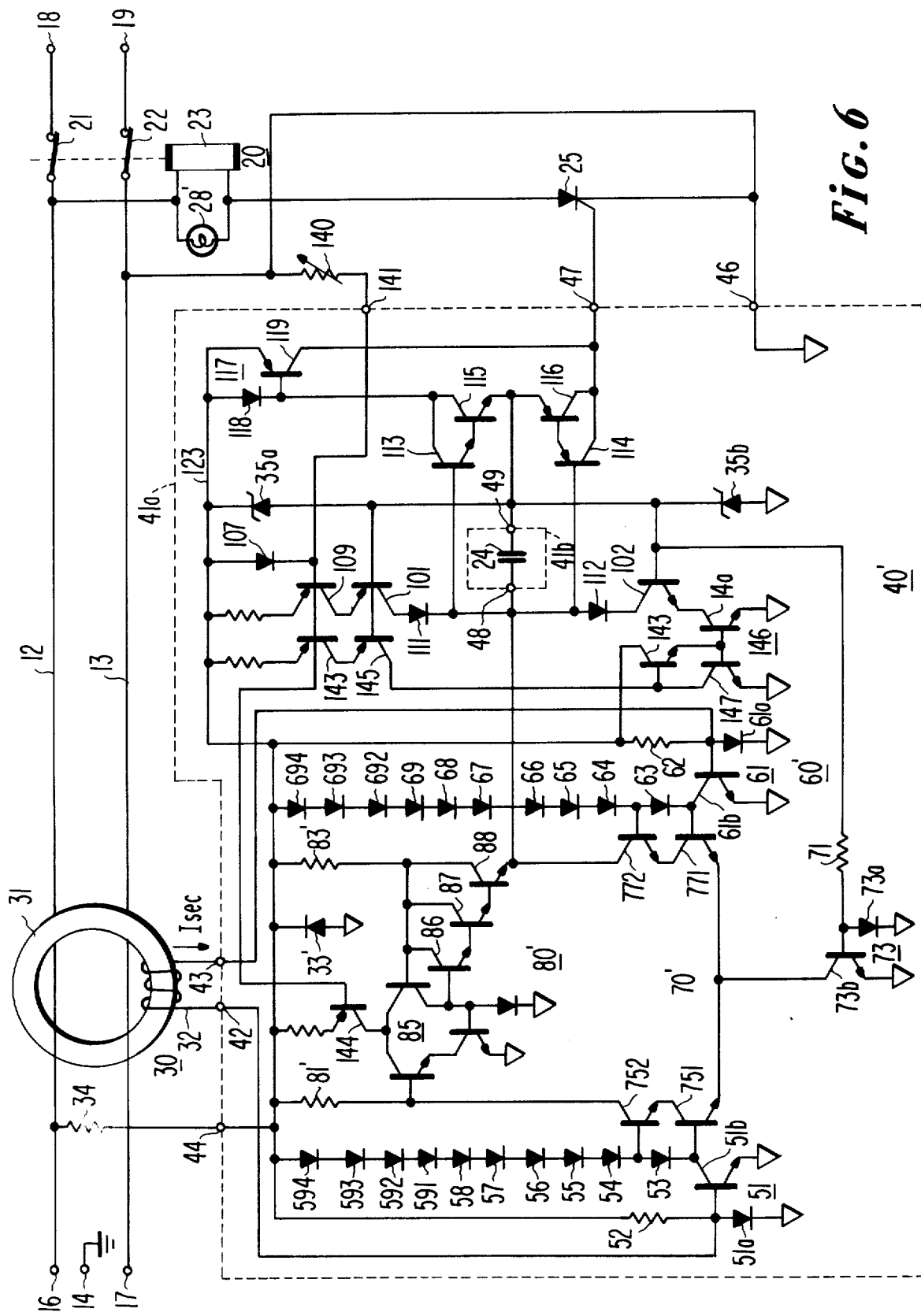
FIG. 6 is a schematic diagram of a ground-fault detection apparatus, alternative to that shown in FIG. 1, embodying the present invention.

FIG. 6 shows a ground-fault interrupter system 10', similar to system 10 of FIG. 1, but designed for use with a pair of single-phase a-c line conductors 12, 13. The system 10' may be operated with conductors 12, 13 either balanced-to-ground, as shown, or single-ended to ground. The system 10 uses a ground fault detector module 40', which, except for external capacitor 24 and a threshold level potentiometer 140, can be made in monolithic integrated circuit form.

Amplifier 50' is similar to amplifier 50 except for avalanche diode 59 being replaced by serially-connected forward-biased diodes 591, 592, 593, 594. Amplifier 60' is similar to amplifier 60 except for avalanche diode 69 being replaced by serially-connected forward-biased diodes 691, 692, 693, 694. Replacing the avalanche diodes with forward-biased diode chains increases the voltage gain of these amplifiers and thus increases the sensitivity obtainable from the ground-fault detector.

Synchronous demodulator 70' is a single-balanced synchronous detector, rather than a doubly-balanced synchronous demodulator 70 as shown in FIG. 1. Transistors 75 and 77 are replaced by transistors 751 and 771 which have transistors 752 and 772, respectively, in cascode connection with them. Single-balanced synchronous demodulators can be used in ground-fault detectors for threewire, ground neutral systems also. In the FIG. 1 system 10, this could have been done by modifying module 40 to eliminate elements 72, 74, 76, 78, for instance.

Current mirror amplifier 80' resembles current mirror amplifier 80 of FIG. 1 except that equal resistance resistors 81' and 83' replace, respectively, a serial connection of diodes 81, 82 and a serial connection of diodes 83, 84.

Operating power is applied to the ground fault detector module 40' when the potential on line conductor 11 is positive with respect to that on line conductor 12. The operating potential on the positive supply bus 123 of the module 40 is constrained to the sum of the potential offsets of avalanche diodes 35$a$ and 35$b$. These avalanche diodes typically exhibit breakdown potentials of 6 volts or so.

A potential half that appearing across the series connection of avalanche diodes 35a and 35b appears at their interconnection, so the function of the potential divider circuit 130 can be subsumed by avalanche diodes 35a and 35b. When the potential on line conductor 11 is negative with respect to that on line conductor 12, a junction 33' becomes conductive to clamp bus 123 to a potential not much more negative than local ground. When module 40' is constructed in monolithic integrated circuit form, junction 33' is provided between the substrate and forward-biased collector isolation boats.

Rheostat 140 is a threshold sensitivity control used to determine what level of $I_{SEC}$ current from secondary winding 32 will be required in order that the presence of a ground fault will be detected. Rheostat 140 is connected in series with diode 107 between bus 123 and local ground to determine the current bled through diode 144 in response to pulses of $V_{44}$ appearing on bus 123. This series connection is made via terminal 141. The potential appearing across diode 107 during pulses $V_{44}$ is applied to the base-emitter circuits of transistors 109 and 143, which are similar, and to the base-emitter circuit of transistor 144, which supplies its collector current as operating current to differential amplifier 85. The collector current of transistor 143, which is the same value as the collector current of transistor 109, is coupled via a common-base amplifier transistor 145 to a current mirror amplifier 146.

Common-base amplifier transistors 145 and 101 have substantially the same unity current gains; so, since their emitter currents are alike, so are their collector currents. (Offset diodes may be connected between the collector electrode of transistor 145 and 147 to better match the collector potentials and thus the current gains of common-base amplifier transistors 101 and 145.) Current mirror amplifier 146, comprising transistors 147, 148, 149 withdraws an emitter current from transistor 102 substantially equal to the collector current of transistor 145. As noted before, the collector currents of transistors 101 and 145 are substantially equal. NPN transistor 102 has nearly unity common-base amplifier gain. The collector currents of transistors 101 and 102 will be closely matched despite PNP transistors, in this circuitry, having relatively low common-emitter forward current gains as compared to the NPN transistors.

Reducing the resistance of the rheostat 140 increases the collector currents of transistors 101 and 102 and increases the level of the synchronously detected unbalance current required to begin charging of capacitor 24. Increasing the resistance of rheostat 140 on the other hand, will reduce the level of synchronously detected unbalance current required to begin charging of capacitor 24 and thus will increase the sensitivity of the ground fault detector module 40' in detecting ground faults.

The ground-fault detector modules 40 and 40' of FIGS. 1 and 6, respectively, have been described as components of ground-fault interrupter systems. The modules 40 and 40' may, also or alternatively, be used to actuate indicators to signal the ground-fault condition to a human being. The neon bulb 28 in FIG. 1 and the incandescent bulb 28' in FIG. 6 are examples of such indicators. Each lights up when the relay coil 23 is energized.

In the following claims, the term "primary winding" with respect to the differential current transformer includes within its scope a single primary turn and also a wire threading the core of the transformer.

What is claimed is:

1. In a method for detecting a ground fault on one of a pair of conductive means, one carrying alternating current of a particular frequency to and the other returning said current from a load, and in which these conductive means serve as primary windings of a differential current transformer, which transformer also includes a secondary winding, the improvement comprising the steps of:

terminating the secondary winding in an impedance which is smaller in value for said particular frequency than the source impedance of said secondary winding, sensing the current flowing through said terminating impedance, and measuring the amplitude of the current flowing through said terminating impedance to indicate the presence or absence of a ground fault.

2. The improvement set forth in claim 1 wherein the measuring step is performed by the following steps:

synchronously detecting the current flowing through said terminating impedance at said particular line frequency to obtain a product signal, and measuring the direct current component of said product signal to indicate the presence or absence of a resistive ground fault.

3. A method as set forth in claim 1 wherein the following steps are included in measuring the direct component of said product signal;

integrating the portion of the product signal which exceeds a first predetermined value and sensing when the resulting signal exceeds a second predetermined value for providing said indication of the presence of a resistive ground fault.

4. Ground-fault detection apparatus for determining the presence of a resistive ground-fault on one of a plurality of a-c power line conductors, said apparatus comprising:

a differential transformer having a plurality of primary windings and a secondary winding, each of said primary windings receiving a current flowing through a respective one of the plurality of a-c power line conductors so that in the absence of a ground-fault in any of said power line conductors no a-c signal current will be induced in said secondary winding and during the occurrence of such ground fault an a-c signal current will be induced in said secondary winding;

means responsive to the potential between a first pair of said a-c power line conductors for providing a first set of control pulses corresponding in timing with peaks of one polarity of that potential;

means responsive to the potential between a second pair of said a-c power line conductors for providing a second set of control pulses corresponding in timing with peaks of one polarity of that potential;

a first controlled-gain amplifier having an input circuit connected to said secondary winding, having an output circuit, and being connected to respond to the presence of control pulses in said first set to provide at its output circuit an amplified signal related to the a-c signal current received at its input circuit and to provide substantially no amplified signal during the intervals between those control pulses;

a second controlled-gain amplifier having an input circuit connected to said secondary winding, having an output circuit, and being connected to respond to the presence of control pulses in said second set to provide at its output circuit an amplified signal related to the a-c signal current received at its input circuit and to provide substantially no amplified signal during the intervals between those control pulses;

combining means for providing a combined signal responsive to the sum of the amplified signals respectively supplied thereto from the respective output circuits of said first and said second controlled-gain amplifiers; and means for determining whether or not the combined signal supplied thereto from said combining means has a direct component of an amplitude and duration indicative of the presence of a resistive ground fault.

5. Ground-fault detection apparatus as set forth in claim 4 wherein said means for determining whether or not the combined signal has a direct component of an amplitude and duration indicative of the presence of a resistive ground-fault comprises:

means for integrating the portions of the combined signal which exceed a predetermined value, thereby to provide an integrated signal, and a threshold detector having an input circuit connected to receive said integrated signal, having an output circuit, and being responsive to said integrated signal exceeding a predtermined threshold in a first sense to provide at its output circuit a signal indicative of a ground fault condition existing in one of said a-c power line conductors.

6. Ground-fault detection apparatus as set forth in claim 5 wherein said threshold detector is also responsive to said integrated signal exceeding a predetermined threshold in a second sense opposite to said first sense to provide at its output circuit a signal indicative of a ground fault condition existing in one of said a-c power line conductors, thereby to eliminate the possibility of ground fault conditions failing to be detected because of said secondary winding being erroneously in reverse connection to the input circuit of said amplifier with controlled gain.

7. In apparatus for detecting a ground fault, which apparatus has a differential current transformer having a core through which line conductors bearing alternating currents pass to serve as the transformer primary windings, said transformer also including a secondary winding, and which apparatus has an amplitude detector with an input circuit to which said secondary winding is connected and with an output circuit for providing indications of a ground fault the improvements comprising:

said amplitude detector being of a type providing said indications responsive to current flowing through said secondary winding rather than potential appearing across said secondary winding, the input circuit of said amplitude detector having an input impedance substantially smaller than the source impedance of said secondary winding, and said core being formed of ferrite.

8. Apparatus for detecting the presence of a ground fault on one of first conductive means carrying alternating current to a load and second conductive means returning said alternating current from said load comprising, in combination:

a differential current transformer, the first and second conductive means serving as the primary windings thereof and having also a secondary winding which exhibits a given source impedance;

terminating means having a lower impedance than said source impedance at the frequency of said alternating current, said terminating means being connected across said secondary winding;

synchronous detector means coupled to said terminating means and operated at the frequency of said alternating current for synchronously detecting the current flow through said terminating means; and means responsive to the signal produced by said synchronous detector means for producing an output signal proportional to the direct current component in said signal.

* * * * *